(12) United States Patent
Diard et al.

(10) Patent No.: US 8,537,166 B1
(45) Date of Patent: Sep. 17, 2013

(54) SYSTEM AND METHOD FOR RENDERING AND DISPLAYING HIGH-RESOLUTION IMAGES

(75) Inventors: Franck R. Diard, Mountain View, CA (US); Ian M. Williams, Menlo Park, CA (US); Eric Boucher, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 833 days.

(21) Appl. No.: 11/952,089

(22) Filed: Dec. 6, 2007

(51) Int. Cl.
*G06F 15/16* (2006.01)
*G06T 1/00* (2006.01)
*G06T 15/00* (2006.01)
*G09G 5/00* (2006.01)

(52) U.S. Cl.
USPC ............................. 345/502; 345/522; 345/1.3

(58) Field of Classification Search
USPC .......................................... 345/502, 522, 1.3
See application file for complete search history.

(56) References Cited

U.S. PATENT DOCUMENTS

| | | | |
|---|---|---|---|
| 5,757,374 A * | 5/1998 | Nakamura et al. ............ | 345/588 |
| 6,917,362 B2 | 7/2005 | Pinedo et al. | |
| 6,956,579 B1 * | 10/2005 | Diard et al. .................... | 345/537 |
| 7,015,915 B1 * | 3/2006 | Diard ............................. | 345/522 |
| 7,029,124 B2 | 4/2006 | Dublin et al. | |
| 7,075,541 B2 * | 7/2006 | Diard ............................. | 345/505 |
| 7,342,588 B2 | 3/2008 | Lefebvre et al. | |
| 7,777,691 B1 | 8/2010 | Nimmer et al. | |
| 2004/0080482 A1 * | 4/2004 | Magendanz et al. .......... | 345/100 |
| 2006/0044215 A1 | 3/2006 | Brody et al. | |
| 2006/0267992 A1 * | 11/2006 | Kelley et al. .................. | 345/502 |
| 2007/0296824 A1 | 12/2007 | Paine et al. | |
| 2008/0055189 A1 | 3/2008 | Wilk et al. | |
| 2008/0211816 A1 * | 9/2008 | Gonzalez et al. ............. | 345/505 |
| 2008/0301675 A1 * | 12/2008 | Cromer et al. .................... | 718/1 |

OTHER PUBLICATIONS

Office Action, U.S. Appl. No. 11/952,090, dated Nov. 2, 2010.
Notice of Allowance, U.S. Appl. No. 11/952,090 dated Apr. 6, 2011.

* cited by examiner

*Primary Examiner* — Jacinta M Crawford
(74) *Attorney, Agent, or Firm* — Patterson & Sheridan, L.L.P.

(57) ABSTRACT

One embodiment of the present invention sets forth a technique for displaying high-resolution images using multiple graphics processing units (GPUs). The graphics driver is configured to present one virtual display device, simulating a high-resolution mosaic display surface, to the operating system and the application programs. The graphics driver is also configured to partition the display surface amongst the GPUs and transmit commands and data to the local memory associated with the first GPU. A video bridge automatically broadcasts this information to the local memories associated with the remaining GPUs. Each GPU renders and displays only the partition of the display surface assigned to that particular GPU, and the GPUs are synchronized to ensure the continuity of the displayed images. This technique allows the system to display higher resolution images than the system hardware would otherwise support, transparently to the operating system and the application programs.

20 Claims, 6 Drawing Sheets

SYSTEM AND METHOD FOR RENDERING AND DISPLAYING HIGH-RESOLUTION IMAGES

BACKGROUND OF THE INVENTION

1. Field of the Invention

The present invention relates generally to the field of graphics processing and more specifically to a system and method for rendering and displaying high-resolution images.

2. Description of the Related Art

A typical computing system includes a central processing unit (CPU), an input device, a system memory, one or more graphics processing units (GPUs), and one or more display devices. A variety of software application programs may run on the computing system. The CPU usually executes the overall structure of the software application program and configures the GPUs to perform specific tasks in the graphics pipeline (the collection of processing steps performed to transform 3-D scenes into 2-D images). Components within the GPUs then transmit the 2-D images through video connectors and video cables to drive the display devices. For example, a scanout unit within a GPU may transmit images through a digital video interface (DVI) connector and a video cable to drive a liquid crystal display (LCD).

Each display device has a maximum resolution that determines the maximum number of pixels in each dimension that the display device may display. Similarly, each video connector has a maximum bandwidth that determines the maximum number of pixels that the video connector may transmit at a given frequency. Typically, each GPU may drive at most two video connectors. To accommodate these hardware limitations, some computing systems are configured to display high-resolution images using multiple GPUs to transmit different portions of the images through multiple video connectors to one or more display devices. For example, a computing system may include four GPUs, four video connectors, and four display devices that are arranged in close proximity to create the illusion of a single, high-resolution, display surface. In such a computing system, each of the four GPUs may be configured to transmit one quadrant of each rendered image frame through one of the video connectors to a corresponding display device.

However, current systems are not well equipped to send high-resolution images across multiple GPUs. For example, in one approach, the operating system and the application programs are configured to interact with each GPU separately. An application program may determine the appropriate visible pixels for each GPU and transmit graphics calls and graphics data to each of the GPUs. One drawback to this approach, however, is that each application program needs to be written specifically to handle multiple GPUs. Furthermore, in such an approach, the number of graphics calls and data that each application program transmits is proportional to the number of GPUs. Transmitting this quantity of data may reduce the performance of the computing system. In addition, since the operating system perceives multiple, independent GPUs, the operating system may make assumptions that do not reflect the optimal behavior for the entire display surface. For example, if a user maximizes a graphical window, then the operating system may resize the window to fill only a single display device attached to one of the GPUs, not all of the display devices.

In another approach, the graphics driver may be configured to receive a single stream of graphics calls and data from each application, generate the appropriate graphics commands for each of the GPUs, and transmit the graphics commands and data to each of the GPUs. This solution eliminates the need for application programs to directly interact with the multiple GPUs. However, although the quantity of graphics commands and data that each application program transmits is reduced, the quantity of graphics commands and data that the graphics driver transmits is still proportional to the number of GPUs. Therefore, the efficiency of the computing system may still be reduced. Furthermore, this solution does not address the sub-optimal behavior of the operating system relative to the display surface.

As the foregoing illustrates, what is needed in the art is a more flexible and efficient technique for rendering and displaying high-resolution images.

SUMMARY OF THE INVENTION

One embodiment of the present invention sets forth a method for rendering and displaying high-resolution images. The method includes the steps of creating a mosaic display surface representing two or more physical display elements, conveying a resolution of the mosaic display surface to an operating system in response to an operating system query, partitioning the mosaic display surface among two or more processing units, and configuring each of the two or more processing units to process graphics commands such that each processing unit renders and displays a different portion of a graphics image, where each portion of the graphics image corresponds to a different partition of the mosaic display surface.

One advantage of the disclosed method is that, since application programs perceive only a single high-resolution virtual display device, all application programs, even those that do not support multiple display devices, may create images that fully occupy all of the display devices. In addition, since the operating system perceives only a single high-resolution virtual display device, the windowing behavior of the operating system is optimized for the corresponding mosaic display surface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
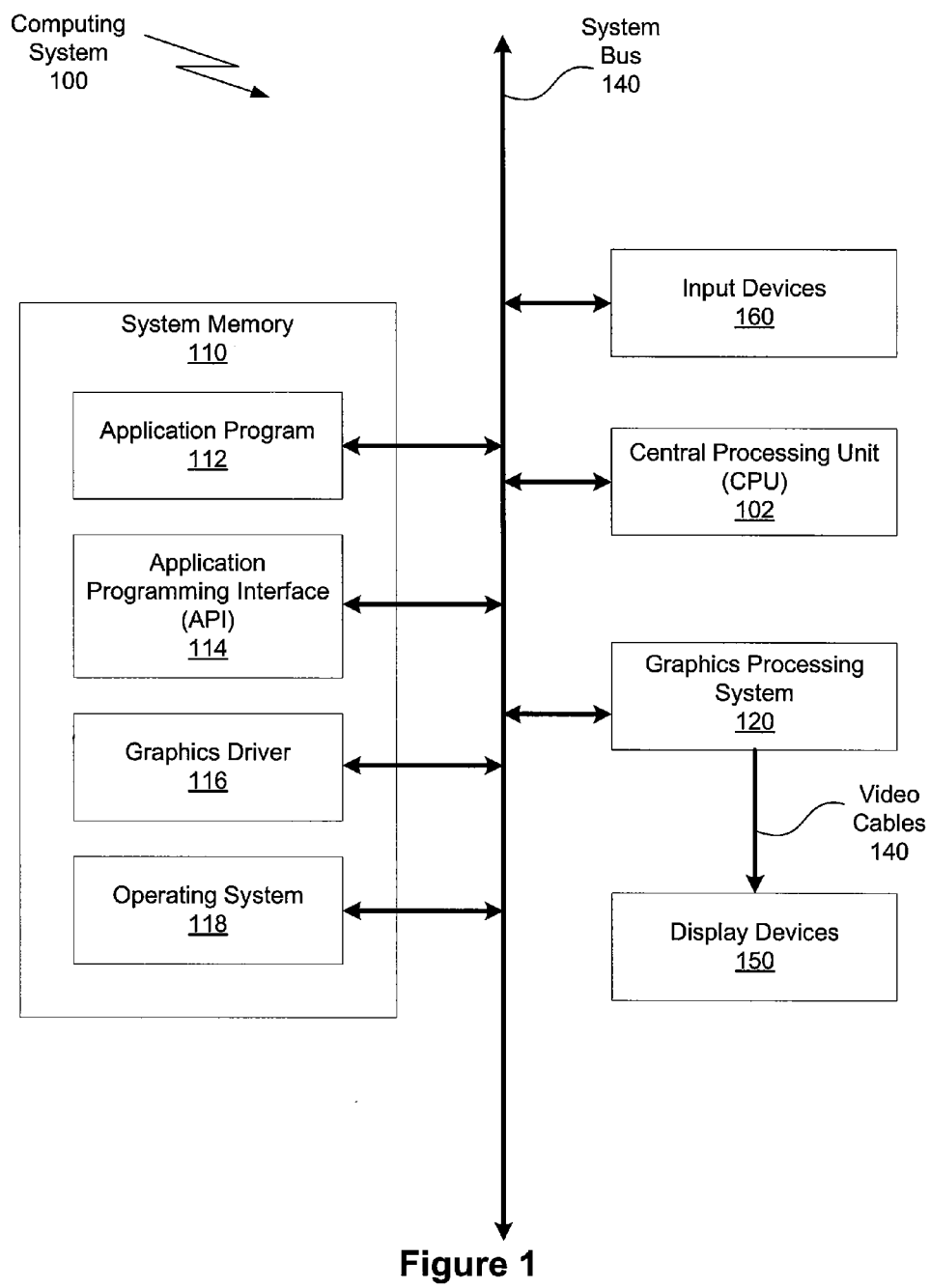
FIG. 1 is a conceptual diagram of a computing system in which one or more aspects of the invention may be implemented.

FIG. 1 is a conceptual diagram of a computing system 100 in which one or more aspects of the invention may be implemented. The computing system 100 includes a central processing unit (CPU) 102, a graphics processing system 120, a system data bus 140, a system memory 110, input devices 160, video cables 140, and display devices 150. In alternate embodiments, the CPU 102, portions of the graphics processing system 120, the system bus 140, or any combination thereof, may be integrated into a single processing unit. Further, the functionality of the graphics processing system 120 may be included in a chipset or in some other type of special purpose processing unit or co-processor.

As shown, the CPU 102 connects to the input devices 160, the system memory 110, and the graphics processing system 120 via the system bus 140. In alternate embodiments, the system memory 110 may connect directly to the CPU 102. The CPU 102 receives user input from the input devices 160, executes programming instructions stored in the system memory 110, operates on data stored in the system memory 110, and configures the graphics processing system 120 to perform specific tasks in the graphics pipeline. The system memory 110 typically includes dynamic random access memory (DRAM) used to store programming instructions and data for processing by the CPU 102 and the graphics processing system 120. The graphics processing system 120 receives instructions transmitted by the CPU 102 and processes the instructions in order to render and display graphics images on the display devices 150.

The system memory 110 includes an operating system 118, one or more application programs 112, an application programming interface (API) 114, and a graphics driver 116. The operating system 118 is typically the master control program of the computing system 100. Among other things, the operating system 118 manages the resources of the computing system 100, such as the system memory 110, and forms a software platform on top of which the application program(s) 112 may run. The application program 112 generates calls to the API 114 in order to produce a desired set of results, typically in the form of a sequence of graphics images. The application program 112 also transmits one or more high-level shading programs to the API 114 for processing within the graphics driver 116. The high-level shading programs are typically source code text of high-level programming instructions that are designed to operate on components within the graphics processing system 120. The API 114 functionality is typically implemented within the graphics driver 116. The graphics driver 116 is configured to translate the high-level shading programs into machine code shading programs that execute on components within the graphics processing system 120.

The graphics processing system 120 executes commands transmitted by the graphics driver 116 in order to render graphics data and images. Subsequently, the graphics processing system 120 may display certain graphics images on the display devices 150 that are connected to the graphics processing system 120 via the video cables 140. Each display device 150 is an output device capable of emitting a visual image corresponding to an input graphics image. For example, each display device 150 may be built using a liquid crystal display (LCD), a cathode ray tube (CRT) monitor, or any other suitable display system.

Figure 2:
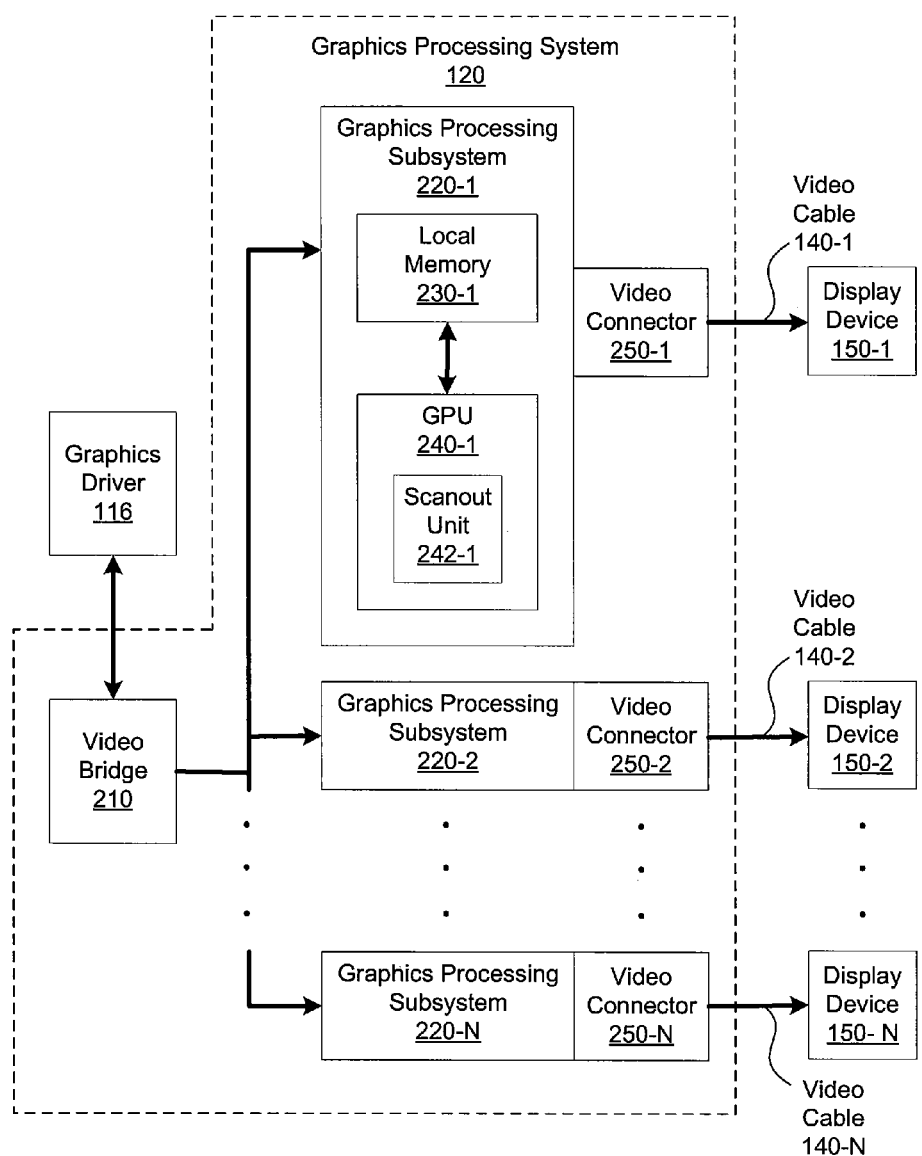
FIG. 2 is a conceptual diagram of the graphics processing system of FIG. 1, according to one embodiment of the invention.

FIG. 2 is a conceptual diagram of the graphics processing system 120 of FIG. 1, according to one embodiment of the invention. The computing system 100 is configured to render and display high-resolution images using the graphics processing system 120, a single graphics driver 116, one or more video cables 140, and one or more display devices 150. As shown, the graphics processing system 120 includes two or more graphics processing subsystems 220 and a single video bridge 210. In some embodiments, the graphics processing system 120 may be part of a discrete graphics card that is connected to the motherboard of the computing system 100 via an expansion slot (e.g., PCI Express or Accelerated Graphics Port).

As shown in detail for the graphics processing subsystem 220-1, each graphics processing subsystem 220 includes a local memory 230, a graphics processing unit (GPU) 240, and a video connector 250. In alternative embodiments, each graphics processing subsystem 220 may include any number of GPUs 240 and any number of video connectors 250. Each graphics processing subsystem 220 may be provided with any amount of local memory 230, including none. Further, each GPU 240 may use both the local memory 230 in the corresponding graphics processing subsystem 220 and the system memory 110 in any combination for memory operations.

As shown in detail for the GPU 240-1, each GPU 240 includes a scanout unit (SU) 242. Within each graphics processing subsystem 220, the SU 242 is configured to scan graphical images from the local memory 230 and, then, transmit these graphics images through one or more video connectors 250. Also within each graphics processing subsystem 220, each SU 242 may transmit digital or analog graphics images from the local memory 230 directly through one or more video connectors 250. The video connectors 250 in each graphics processing subsystem 220 may convey the graphics images to the set of display devices 150 that are attached to the particular graphics processing subsystem 220 via a subset of the video cables 140. For example, a SU may transmit digital graphics images from a local memory through a digital video interface (DVI) connector and a digital video cable to an LCD.

Each video connector 250 may be any connector, such as a DVI connector or a video graphics array (VGA) connector, capable of passing graphics image through one or more of the video cables 140 to one or more of the display devices 150. In some embodiments, each video connector 250 may attach to more than one display device 150. Similarly, any subset of the video connectors 250 in the graphics processing system 120 may attach to a single display device 150. For example, four video connectors 250 may connect four graphics processing subsystems 220, via four video cables 140, to a sixty-four inch LCD which includes four DVI inputs.

As described in greater detail herein, to render and display high-resolution images, the graphics driver 116 may create a high-resolution mosaic display surface that is driven by multiple GPUs 240. The graphics driver 116 may partition the mosaic display surface amongst the GPUs 240 and, then, configure each GPU 240 to render and display only the portion of a particular graphics image included in the partition of the mosaic display surface assigned to that specific GPU 240. The mosaic display surface may include the display surfaces of the display devices 150 organized in any technically feasible fashion. For example, the display devices 150 may be arranged in close proximity to simulate the high-resolution mosaic display surface. In alternate embodiments, the mosaic display surface may include the display surfaces associated with any display elements, such as the video connectors 250. Further, the graphics driver 116 may determine the distribution of the display surface amongst the GPUs 240 and the resolution of the mosaic display surface in any technically feasible fashion. For example, a graphical interface (not shown) may be used to assign a specific partition of the mosaic display surface to a particular GPU 240. In some embodiments, the graphics driver 116 may be configured to assign non-overlapping partitions to each of the GPUs 240. In such a configuration, the graphics driver 116 may sum the resolutions of the display devices 150 to obtain the resolution of the mosaic display surface. In other embodiments, the graphics driver 116 may be configured to assign slightly overlapping partitions to each of the GPUs 240, thereby "smoothing" the visual transition between adjacent display devices 150. In such a configuration, the graphics driver 116 may subtract the overlapped pixels from the sum of the resolutions of the display devices 150 to obtain the resolution of the mosaic display surface. In other embodiments, the graphics driver may also factor in distortion in how it apportions a mosaic display surface across multiple GPUs.

Figure 3A:
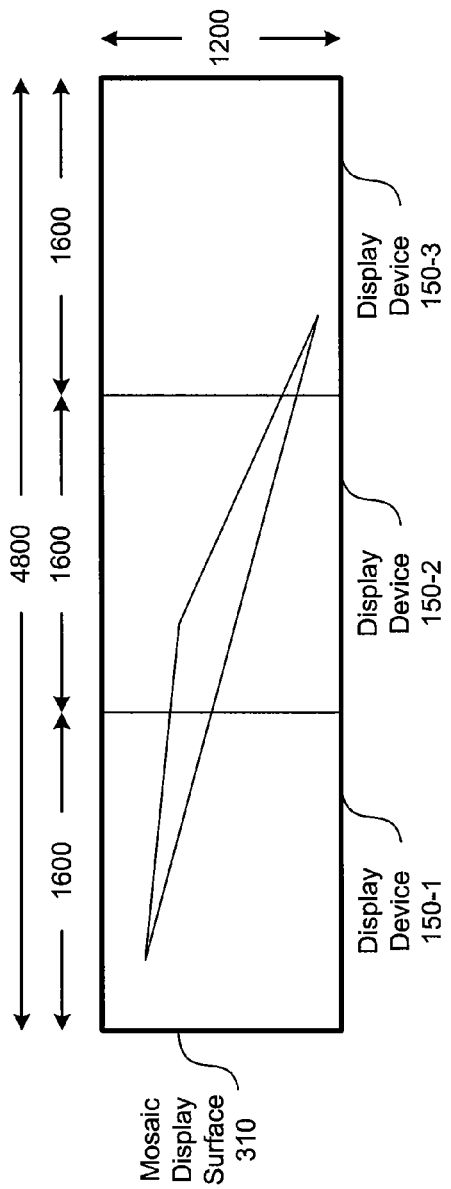
FIG. 3A is a conceptual diagram of an exemplary mosaic display surface, according to one embodiment of the invention.

FIG. 3A illustrates an exemplary mosaic display surface 310 with a resolution of 4800-by-1200 pixels, according to one embodiment of the invention. As shown, the mosaic display surface 310 includes three displays devices 150, display device 150-1, display device 150-2, and display device 150-3. Each display device 150 is a separate display device 150 with a resolution of 1600-by-1200 pixels, and each of these display devices 150 is driven by a separate GPU 240. The three display devices 150 are arranged side-by-side to create the illusion of a single 4800-by-1200 pixel virtual display device. As shown, a triangle is displayed across the three display devices 150. Display device 150-1 depicts the portions of the triangle corresponding to horizontal pixels 0 through 1600, display device 150-2 depicts the portions of the triangle corresponding to horizontal pixels 1600 through 3200, and display device 150-3 depicts the portions of the triangle corresponding to horizontal pixels 3200 through 4800. In alternate embodiments, any number of display devices, with any resolutions, may be included in the mosaic display surface. For example, four display devices may be arranged in a two-by-two rectangular configuration, and each of four attached GPUs may be configured to render and display one quadrant of the mosaic display surface.

Referring back now to FIG. 2, before the CPU 102 configures the graphics processing system 120 to render and display graphics images, the operating system 118 may determine the number and resolution of the display devices 150 driven by the graphics processing system 120. The operating system 118 may obtain this information by querying the graphics driver 116 and, subsequently, relays this information to the application programs 112. The graphics driver 116 is specifically configured to inform the operating system 118 that the graphics processing system 120 is connected to a single virtual display device with a resolution corresponding to the resolution of the mosaic display surface 310, rather than being connected to multiple, separate display devices, as is done in prior art approaches. Configuring the graphics driver 116 in this fashion enables the operating system 118 and the application programs 112 to fully utilize the entire mosaic display surface 310, while remaining unaware of the physical implementation of the mosaic display surface 310 (i.e., the number of display devices making up the mosaic display surface 310).

Since the built-in behavior of an operating system is typically optimized for a single display device, and the operating system 118 perceives only a single virtual display device, the behavior of the operating system 118 is optimized to target the mosaic display surface 310. For example, if a user maximizes a graphics window, then the operating system 118 may resize the graphics window to fill the single virtual display device, thereby filling all of the display devices 150 included in the mosaic display surface 310. Similarly, graphics calls emitted by the application programs 112 may automatically target the entire mosaic display surface 310. Therefore, the functionality of the graphics driver 116, in presenting only the mosaic display surface 310 to the operating system 118, enables the operating system 118 to behave in an optimized manner.

The graphics driver 116 may communicate with the graphics processing system 120 using a stream of commands called a "push buffer." The graphics driver 116 may use the push buffer to partition the mosaic display surface 310 amongst the GPUs 240. For example, the graphics driver 116 may insert a "set device mask" command into the push buffer to assign subsequent commands to a particular GPU 240. If a particular GPU 240 is not the target of a "set device mask" command, then the GPU 240 will ignore subsequent commands in the push buffer until another "set device mask" command targets that particular GPU 240. After inserting a "set device mask" command into the push buffer to select a single GPU 240, the graphics driver 116 may assign a specific partition of the mosaic display surface 310 to be rendered by that particular GPU 240 and displayed by the SU 242 in that particular GPU 240 by inserting a "set clip rectangle" command into the push buffer. In this fashion, the graphics driver 116 may insert "set device mask" and "set clip rectangle" commands into the push buffer to configure each of the GPUs 240 to render and display only the specific partition of the mosaic display surface 310 that is assigned to that particular GPU 240.

The graphics driver 116 may also use the push buffer to configure the graphics processing system 120 to implement the graphics calls from the application programs 112 (not shown in FIG. 2). After initializing the rendering and display partitions, the graphics driver 116 may insert a final "set device mask" command and a subsequent "everyone" command into the push buffer. These two commands configure all of the GPUs 240 to execute all subsequent commands in the push buffer. The graphics driver 116 may then configure the push buffer to implement the set of graphics commands corresponding to the graphics calls from the application programs 112. Again, the applications programs 112 are aware of only a single mosaic display surface 310, and therefore the applications programs 112 may emit graphics calls that target the entire mosaic display surface 310. However, since the graphics driver 116 has partitioned the mosaic display surface 310 amongst the GPUs 240, each of the GPUs 240 may process the same push buffer, rendering and displaying only the partition of the mosaic display surface 310 assigned to that particular GPU 240. In alternate embodiments, the graphics driver 116 may communicate with the graphics processing system 120 in any technically feasible manner, such as inserting different commands into the push buffer or employing a communication technique other than a push buffer.

Figure 3B:
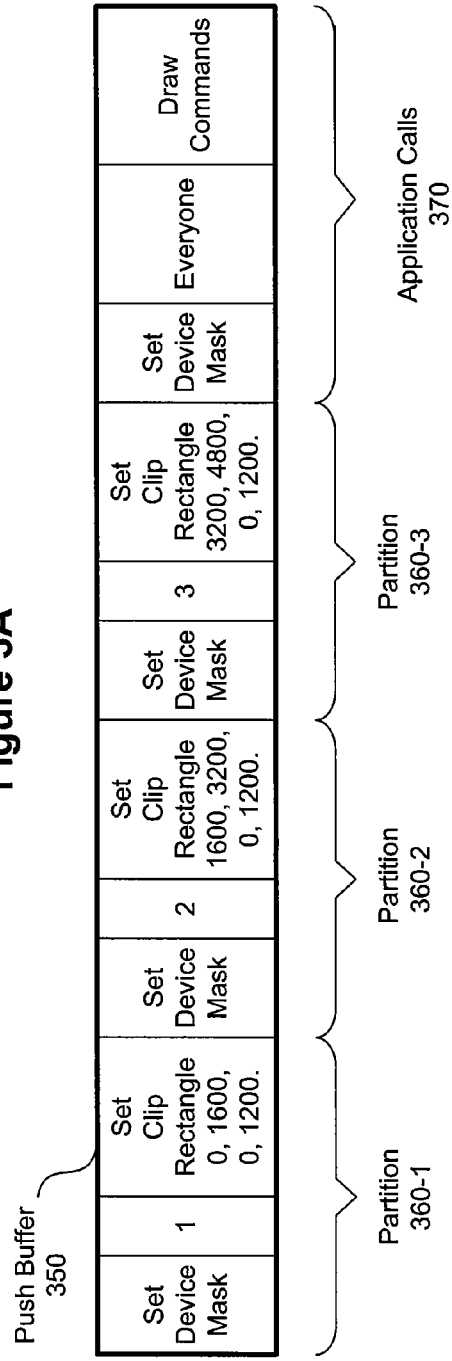
FIG. 3B is a conceptual diagram of an exemplary push buffer, according to one embodiment of the invention.

FIG. 3B illustrates an exemplary push buffer 350 corresponding to the mosaic display surface 310 of FIG. 3A, according to one embodiment of the invention. As shown, the push buffer 350 includes sets of commands designed to implement a partition 360-1 corresponding to the display device 150-1, a partition 360-2 corresponding to the display device 150-2, a partition 360-3 corresponding to the display device 150-3, and application calls 370. For example, the set of commands inserted into the push buffer 350 to setup partition 360-1 include "set device mask," "1," and "set clip rectangle 0, 1600, 0, 1200." Together, the "set device mask" and the subsequent "1" commands configure the GPUs 240 such that only the GPU 240 designated "1" implements the "set clip rectangle 0, 1600, 0, 1200" command. Therefore, the partition 360-1 commands configure the GPU 240 designated "1" to render and display only the portions of images that are included within the rectangle bounded by coordinates 0, 1600, 0, 1200. The other GPUs 240 may process the push buffer 350, but will ignore the "set clip rectangle 0, 1600, 0 1200" command. Similarly, only the GPU 240 designated "2" implements the "set clip rectangle 1600, 3200, 0, 1200" command. As shown in the application calls 370, the commands corresponding to the graphics calls emitted by the application programs 112 are preceded by a "set device mask" command and an "everyone" command. Together, these two commands configure all of the GPUs 240 to implement the subsequent push buffer commands.

Referring back now to FIG. 2, the video bridge 210 may be configured to synchronize the scan-out and frame flipping of the SUs 242 in the graphics processing system 120. This synchronization may avoid flickering and tearing the graphics images displayed on the display devices 150. The video bridge 210 may accomplish this synchronization in any technically feasible fashion. For example, the video bridge 210 may be configured to transmit a horizontal synchronization signal, a vertical synchronization signal, and a frame swap signal to coordinate the SUs 242. In other embodiments, the video bridge 210 may be replaced with core logic that is configured to provide similar functionality. The core logic may be included in a chip set disposed between the CPU 102 and the graphics processing subsystems 220.

Figure 4:
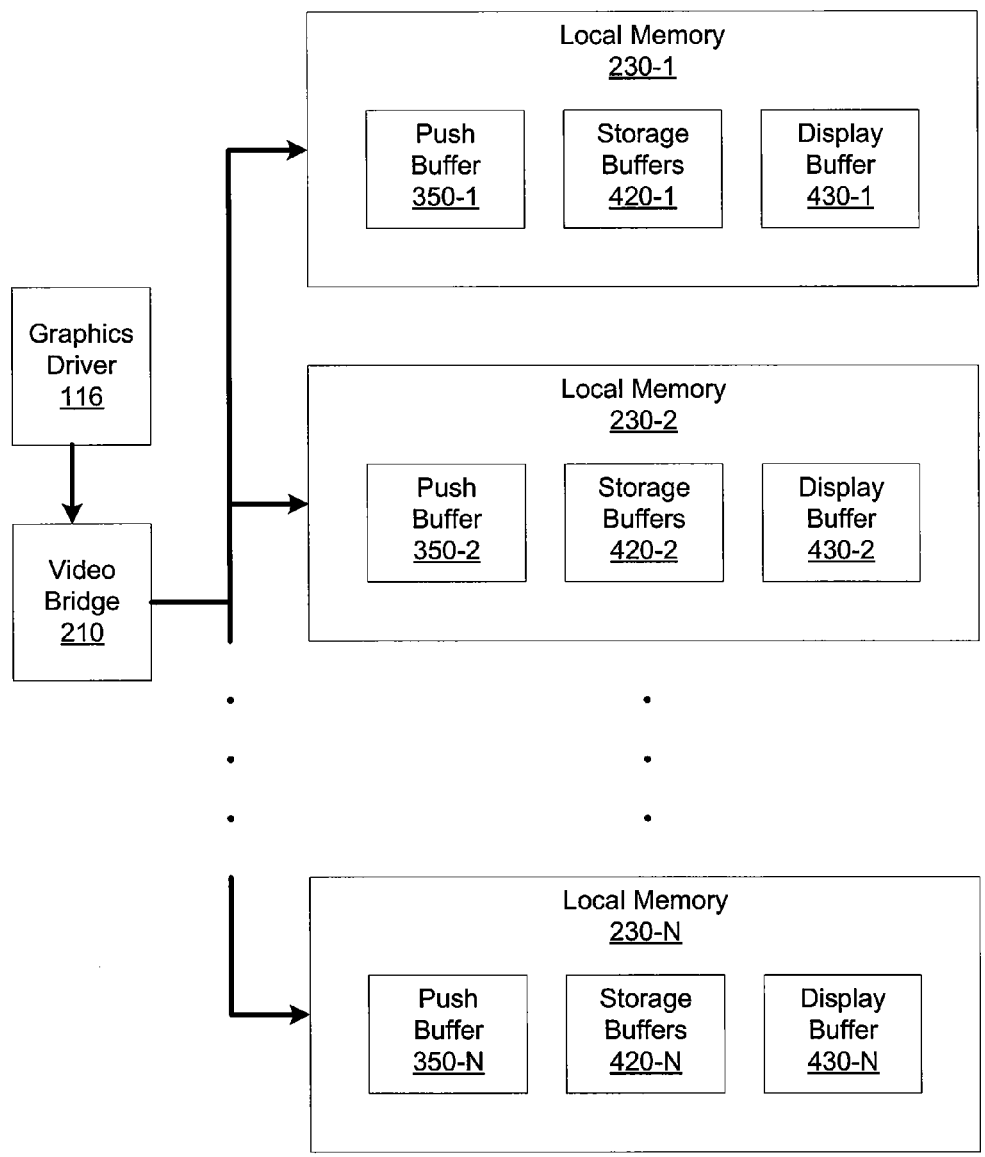
FIG. 4 is a conceptual diagram of the video bridge and the local memories of FIG. 2 that enable a broadcast mode, according to one embodiment of the invention.

FIG. 4 is a conceptual diagram of the video bridge 210 and the local memories 230 of FIG. 2 that enable a broadcast mode, according to one embodiment of the invention. Within each graphics processing subsystem 220, the local memory 230 is used to store data and programming used by the GPU 240. As shown, each local memory 230 includes a display buffer 430, a push buffer 350, and storage buffers 420.

Within each graphics processing subsystem 220, the display buffer 430 stores data for at least one two-dimensional surface that may be used to drive the display device 150 that is attached to the graphics processing subsystem 220. Furthermore, each display buffer 430 may include more than one two-dimensional surface so that each GPU 240 can render to one two-dimensional surface while another two-dimensional surface is used to drive the attached display device 150. The graphics driver 116 may allocate enough memory to store the entire mosaic display surface 310 in each of the display buffers 430. However, within each graphics processing subsystem 220, as detailed above, each GPU 240 may be configured to render only the partition of the mosaic display surface 310 that is assigned to the particular GPU 240. Similarly, the SU 242 included in each GPU 240 is configured to display only the partition of the mosaic display surface 310 that is assigned to that particular GPU 240.

As detailed above in conjunction with FIG. 2, the graphics driver 116 may communicate with the graphics processing system 120 using the push buffers 350. Within each graphics processing subsystem 220, the GPU 240 may be configured to process graphics commands in the push buffer 350 included in the local memory 230. For example, within the graphics processing subsystem 220-1, the GPU 240-1 may be configured to process graphics commands in the push buffer 350-1 included in the local memory 230-1. Similarly, within the graphics processing subsystem 220-2, the GPU 240-2 may be configured to process graphics commands in the push buffer 350-2 included in the local memory 230-2. The graphics driver 116 may store in the storage buffers 420 other graphic data received from the application programs 112 and used by GPUs 240.

The video bridge 210 may be configured to minimize the quantity of graphics commands and graphics data transmitted from the graphics driver 116 to the graphics processing system 120 via the system bus 140 using a technique known as "broadcast mode." In broadcast mode, the video bridge 210 may be configured such that any information that the graphics driver 116 writes to the local memory 230-1 (associated with the first GPU 240-1) is automatically reflected in the local memories 230-2 through 230-N (associated with the remaining CPUs 240-2 through 240-N). As detailed below, these memory copies are accomplished in hardware and bypass the system bus 140. Advantageously, only one set of graphics commands and graphics data is transmitted via the system bus 140, thereby reducing the amount of information that has to flow through the system bus 140. For example, the graphics driver 116 may write graphics commands to the push buffer 350-1. With broadcast mode, these graphics commands will automatically be reflected in the remaining push buffers 350-2 through 350-N. Similarly, the graphics driver 116 may write graphics data received from the application programs 112 to the storage buffers 420-1. Again, in broadcast mode, this graphics data will automatically be reflected in the remaining storage buffers 420-2 through 420-N. However, data written by components within each graphics processing subsystem 220, such as data written from the GPU 240-1 to the display buffer 430-1, is not replicated amongst the other graphics processing subsystems 220.

The broadcast mode may be implemented in any technically feasible fashion. For example, the graphics driver 116 may program values, e.g., addresses, stored in remap registers and translation registers in the video bridge 210. The values in the remap registers may include addresses which define broadcast regions within the local memory 230-1, such as the push buffer 350-1 and the storage buffers 420-1. Similarly, the values in the translation registers may include the base addresses of the corresponding regions in the local memories 230-2 through 230-N, such as the push buffers 350-2 through 350-N and the storage buffers 420-2 through 420-N. Upon receiving a write access, the video bridge 210 is configured to evaluate the address associated with the write access in conjunction with the remap registers to determine if the access is within the broadcast regions. If the write access is within the broadcast regions, then the video bridge 210 uses the translation registers to determine the corresponding broadcast addresses. Subsequently, the video bridge 210 transmits the data associated with the write access to the address associated with the write access and, also, to any corresponding broadcast addresses. Therefore, a single write access may be broadcast to write to each local memory 230, thereby using less system bandwidth compared with separately writing to each local memory 230.

Again, in alternative embodiments, the video bridge 210 may be replaced with core logic that is configured to provide similar functionality. The core logic may be included in a chip set disposed between the CPU 102 and the graphics processing subsystems 220. Furthermore, in other embodiments, the video bridge 210 may not be configured to implement the broadcast mode and the graphics driver 116 may write the push buffer 350 to each of the local memories 230.

Figure 5:
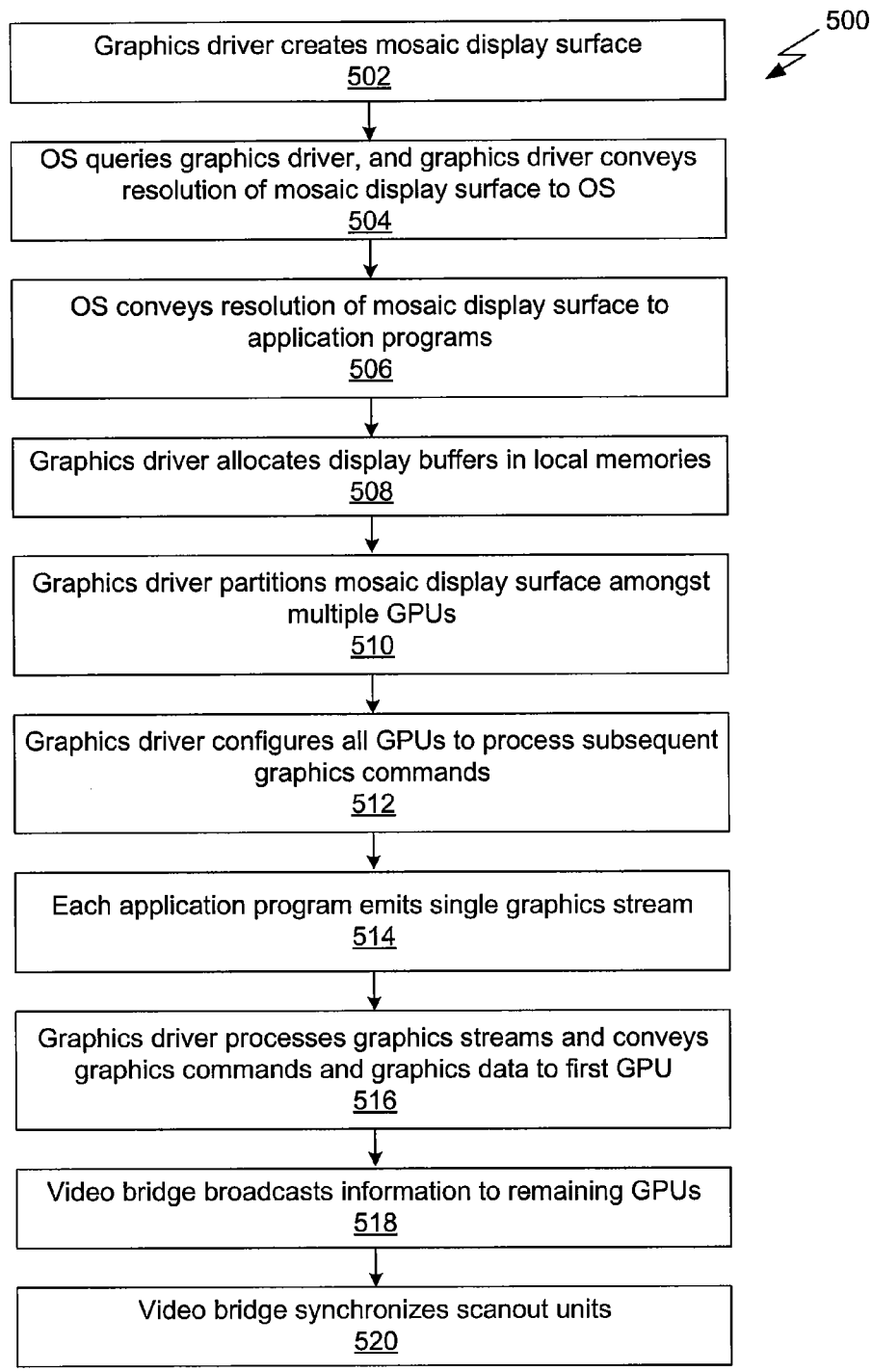
FIG. 5 is a flow diagram of method steps for rendering and displaying high-resolution images, according to one embodiment of the invention.

FIG. 5 is a flow diagram of method steps for rendering and displaying high-resolution images, according to one embodiment of the invention. Although the method steps are described in conjunction with the systems for FIGS. 1-2 and 4, persons skilled in the art will understand that any system that performs the method steps, in any order, is within the scope of the invention.

As shown, the method 500 begins at step 502, where the graphics driver 116 creates a high-resolution mosaic display surface and determines the resolution of the mosaic display surface. As detailed above in conjunction with FIG. 2, the graphics driver 116 may determine the resolution of the mosaic display surface using the resolutions of the display devices 150 connected to the graphics processing system 120. In step 504, the operating system 118 queries the graphics driver 116 to determine the number and resolution of the display devices 150 connected to the graphics processing system 120. Since the graphics driver 116 is configured to render and display images on the mosaic display surface, the graphics driver 116 conveys to the operating system 118 that the graphics processing system 120 includes a single virtual display device which has a resolution corresponding to the resolution of the mosaic display surface. The graphics driver 116 does not convey any information about the physical display devices 150 to the operating system 118. Thereafter, the operating system 118 behaves as though there is only a single high-resolution virtual display device attached to the graphics processing system 120. In step 506, the operating system 118 conveys the display information received from the graphics driver 116 in step 504 to the application programs 112. Again, the application programs 112 subsequently behave as though there is only a single high-resolution virtual display device attached to the graphics processing system 120. In step 508, the graphics driver 116 allocates enough storage space in each of the display buffers 430 to contain the entire mosaic display surface.

In step 510, the graphics driver 116 partitions the mosaic display surface amongst the GPUs 240. Further, the graphics driver 116 configures each GPU 240 to render and display only the partition of the mosaic display surface assigned to that particular GPU 240. The graphics driver 116 may configure the GPUs 240 in any technically feasible fashion. Note that a series of method steps that may be used to accomplish step 510 is described in greater detail below in steps 602-612 of FIG. 6. In step 512, the graphic driver 116 configures each GPU 240 to process all subsequent graphics commands. Although each GPU 240 may process the same graphics commands, each GPU 240 will render and display only the partition of the mosaic display surface assigned to that particular GPU 240 in step 510. Again, this step may be accomplished in any technically feasible fashion. For example, one way to accomplish this step is described in step 614 of FIG. 6.

In step 514, each application program 112 emits a single graphics stream including both graphics calls and graphics data. Advantageously, each application program 112 may emit graphics calls that target the entire mosaic display surface. In step 516, the graphics driver 116 processes the graphics calls, generates corresponding graphics commands, and writes the graphics commands and the graphics data to the local memory 230-1 associated with the GPU 240-1. The GPU 240-1 then executes the graphics commands and operates on the graphics data in the local memory 230-1. Again, this step may be accomplished in any technically feasible fashion. For example, one way to accomplish this step is described in step 616 of FIG. 6. In step 518, the video bridge 210 broadcasts the graphics commands and data written by the graphics driver 116 to the local memory 230-1 to the local memories 230-2 through 230-N, associated with the GPUs 240-2 through 240-N. The GPUs 240-2 through 240-N then execute the graphics commands and operate on the graphics data in their corresponding local memories 230-2 through 230-N. In step 520, the video bridge 210 synchronizes the SUs 242 horizontally, vertically, and by frame to ensure continuity of the images displayed on the display devices 150 included in the mosaic display surface.

Figure 6:
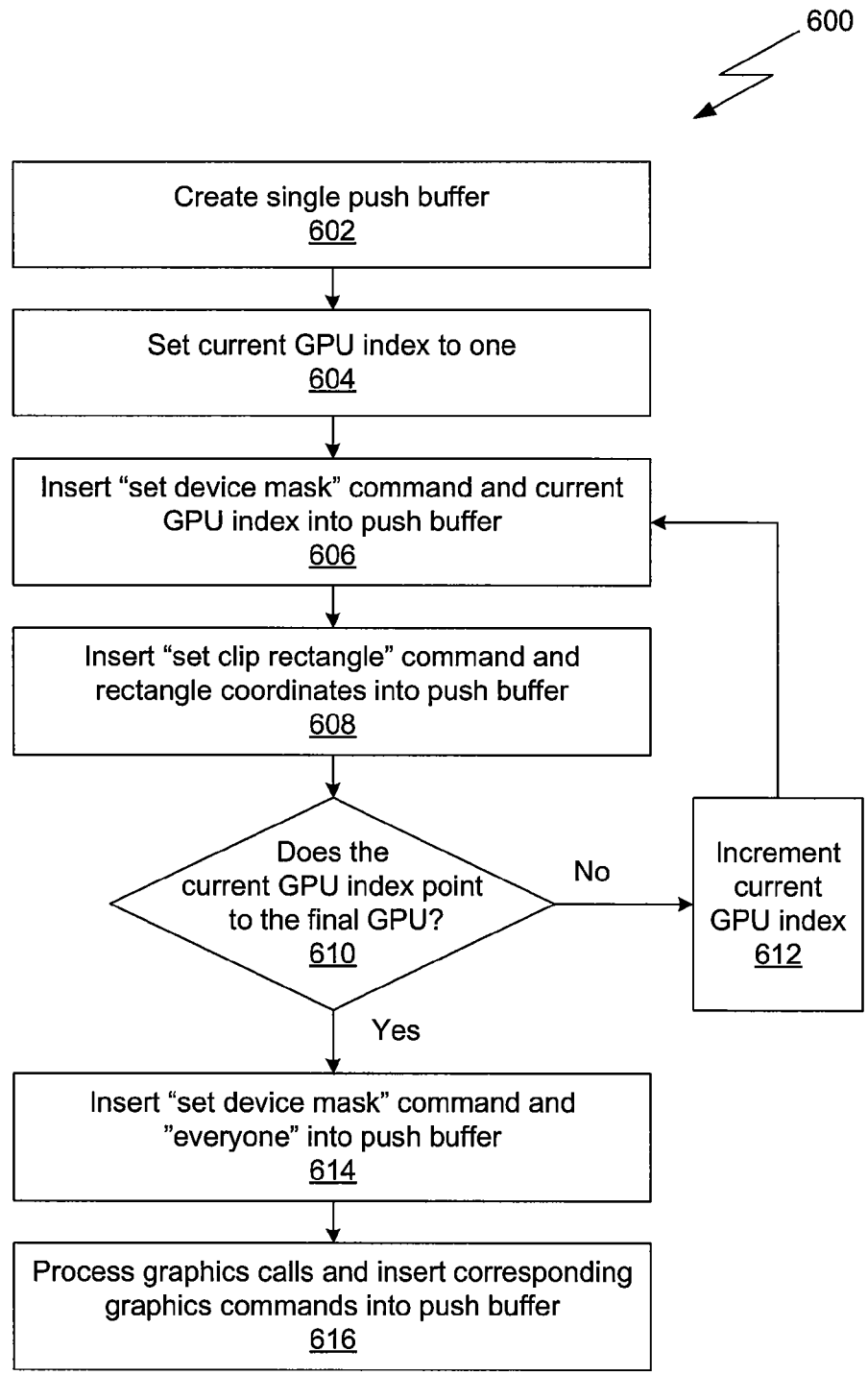
FIG. 6 is a flow diagram of method steps executed by the graphics driver to create a push buffer, according to one embodiment of the invention.

FIG. 6 is a flow diagram of method steps executed by the graphics driver 116 to create the push buffer 350-1, according to one embodiment of the invention. Although the method steps are described in conjunction with the systems for FIGS. 1-2 and 4, persons skilled in the art will understand that any system that performs the method steps, in any order, is within the scope of the invention.

As shown, the method 600 begins at step 602, where the graphics driver 116 creates the push buffer 350-1. In step 604, the graphics driver 116 sets a current GPU index to one. In step 606, the graphics driver 116 inserts a "set device mask" command followed by the GPU index into the push buffer 350-1. As detailed above in conjunction with FIG. 2, this pair of commands configures the GPU 240 associated with the GPU index, in this case one, to execute the subsequent commands in the push buffer 350-1. This pair of commands also configures the other GPUs 240 to ignore the commands in the push buffer 350-1 until a new "set device mask" command is encountered. In step 608, the graphics driver 116 inserts a "set clip rectangle" and coordinates specifying the rectangular boundary of the partition of the mosaic display surface that is assigned to the GPU 240 associated with the GPU index into the push-buffer 350-1. This command configures the single GPU 240 associated with the GPU index to render and display only the portions of graphics images that are included within the partition specified by the coordinates. At step 610, the graphics driver 116 compares the GPU index to the total number of GPUs 240 included in the graphics processing system 120. If the graphics driver 116 determines that the GPU index is smaller than the total number of GPUs 240 included in the graphics processing system 120, then the method 600 proceeds to step 612 where the graphics driver 116 increments the GPU index and the method 600 returns to step 606. The method continues in this fashion, looping through steps 606-612 until each of the GPUs 240 has been configured to display and render a specific portion of the mosaic display surface.

At step 610, if the graphics driver 116 determines that the GPU index equals the total number of GPUs 240 included in the graphics processing system 120, then the method 600 proceeds to step 614. In step 614, the graphics driver 116 inserts a "set device mask" command followed by "everyone" into the push buffer 350-1. As detailed above in conjunction with FIG. 2, this pair of commands configures all the GPUs 240 to execute all subsequent commands in the push buffer 350-1. In step 616, the graphics driver 116 processes graphics calls received from the application programs 112 and inserts a set of corresponding graphics commands into the push buffer 350-1. Advantageously, each GPU 240 may process the same push buffer 350-1, rendering and displaying only the partition of the mosaic display surface assigned to that particular GPU 240.

In sum, high-resolution images may be efficiently rendered and displayed by creating a high-resolution mosaic display surface and partitioning the display surface amongst multiple GPUs. In one embodiment, the computing system includes a single graphics driver, multiple GPUs, a video bridge, and one or more display devices arranged to depict a single high-resolution mosaic display surface. In operation, the graphics driver presents only one virtual display device, simulating the mosaic display surface, to the operating system and, consequently, to the applications programs. However, unknown to the operating system and the applications programs, the graphics driver inserts initialization commands into the push buffer to partition the mosaic display surface amongst the various GPUs. As the application programs generate graphics calls targeted to the mosaic display surface, the graphics driver inserts a set of corresponding graphics commands into the push buffer. The graphics driver is configured to write the push buffer and the associated graphics data only once, into the local memory associated with the first GPU. The video bridge is configured such that any data the graphics driver writes to the local memory associated with the first GPU is automatically reflected in the local memories associated with the remaining GPUs—a configuration known as broadcast mode. Each GPU processes their local copy of the same push buffer, rendering and displaying only the partition of the display surface assigned to that particular GPU via the corresponding graphics commands. The video bridge synchronizes the GPUs horizontally, vertically, and by frame, to ensure the continuity of the displayed images.

Advantageously, since the application programs perceive only a single high-resolution virtual display device, all application programs, even those that do not support multiple display devices, may create images that fully occupy all of the display devices. Furthermore, because of the broadcast mode functionality, the amount of graphics information transmitted by the applications programs and the graphics driver over the system bus does not increase as additional GPUs are added. Therefore, additional display resolution may be added to the computing system without impacting the overall performance of the computing system. Finally, since the operating system perceives only a single high-resolution virtual display device, the windowing behavior of the operating system is optimized for the corresponding mosaic display surface. For example, if a user maximizes a graphical window, then the operating system will resize the window to fill all of the display devices included in the mosaic display surface.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for creating a push buffer for rendering and displaying graphics images on a mosaic display surface, the method comprising:
   determining a resolution of the mosaic display surface;
   informing an operating system that the mosaic display surface is a single virtual display device with a resolution corresponding to the resolution of the mosaic display surface;
   inserting sets of commands into the push buffer to configure each of two or more processing units to render and display a different portion of a graphics image, wherein each portion of the graphics image corresponds to a different partition of the mosaic display surface;
   inserting, after the sets of commands, at least one additional command into the push buffer to configure all of the two or more processing units to execute all subsequent commands in the push buffer, including a plurality of graphics commands to generate the graphics image;
   receiving graphics calls from a software application; and
   processing the graphics calls to generate the plurality of graphics commands and inserting the graphics commands into the push buffer following the at least one additional command.

2. The method of claim 1, wherein the sets of commands to configure each of the two or more processing units to render and display a different portion of the graphics image comprise a plurality of commands that configure one of the two or more processing units to execute at least one command defining one of the different partitions of the mosaic display surface.

3. The method of claim 2, wherein the plurality of commands that configure one of the two or more processing units to execute the at least one command defining one of the different partitions of the mosaic display surface comprise a set device mask command and a processing unit identifier command that configure the processing units such that only the processing unit associated with the processing unit identifier command executes the at least one command defining one of the different partitions of the mosaic display surface.

4. The method of claim 1, wherein the at least one additional command to configure all of the two or more processing units to execute all subsequent commands in the push buffer comprise a set device mask command and an everyone command.

5. The method of claim 1, wherein each of the plurality of graphics commands is configured to target the entire mosaic display surface.

6. The method of claim 1, wherein the software application perceives only a single high-resolution virtual display device.

7. The method of claim 1, wherein the different portions of the graphics image rendered by each of the two or more processing units overlap.

8. A non-transitory computer-readable medium including instructions that, when executed by a first processor, cause the first processor to create a push buffer for rendering and displaying graphics images on a mosaic display surface, by performing the steps of:
   determining a resolution of the mosaic display surface;
   informing an operating system that the mosaic display surface is a single virtual display device with a resolution corresponding to the resolution of the mosaic display surface;
   inserting sets of commands into the push buffer to configure each of two or more processing units to render and display a different portion of a graphics image, wherein each portion of the graphics image corresponds to a different partition of the mosaic display surface;
   inserting, after the sets of commands, at least one additional command into the push buffer to configure all of the two or more processing units to execute all subsequent commands in the push buffer, including a plurality of graphics commands to generate the graphics image;

receiving graphics calls from a software application; and processing the graphics calls to generate the plurality of graphics commands and inserting the graphics commands into the push buffer following the at least one additional command.

9. The computer-readable medium of claim 8, wherein the sets of commands to configure each of the two or more processing units to render and display a different portion of the graphics image comprise a plurality of commands that configure one of the two or more processing units to execute at least one command defining one of the different partitions of the mosaic display surface.

10. The computer-readable medium of claim 9, wherein the plurality of commands that configure one of the two or more processing units to execute the at least one command defining one of the different partitions of the mosaic display surface comprise a set device mask command and a processing unit identifier command that configure the processing units such that only the processing unit associated with the processing unit identifier command executes the at least one command defining one of the different partitions of the mosaic display surface.

11. The computer-readable medium of claim 8, wherein the at least one additional command to configure all of the two or more processing units to execute all subsequent commands in the push buffer comprise a set device mask command and an everyone command.

12. The computer-readable medium of claim 8, wherein each of the plurality of graphics commands is configured to target the entire mosaic display surface.

13. The computer-readable medium of claim 8, wherein the software application perceives only a single high-resolution virtual display device.

14. The computer-readable medium of claim 8, wherein the different portions of the graphics image rendered by each of the two or more processing units overlap.

15. A computing device, comprising:

two or more processing units;

a graphics driver configured to create a push buffer of commands for rendering and displaying graphics images on a mosaic display surface, wherein the graphics driver is specifically configured to:

determine a resolution of the mosaic display surface;

inform an operating system that the mosaic display surface is a single virtual display device with a resolution corresponding to the resolution of the mosaic display surface;

insert sets of commands into the push buffer to configure each of two or more processing units to render and display a different portion of a graphics image, wherein each portion of the graphics image corresponds to a different partition of the mosaic display surface;

insert, after the sets of commands, at least one additional command into the push buffer to configure all of the two or more processing units to execute all subsequent commands in the push buffer, including a plurality of graphics commands to generate the graphics image;

receive graphics calls from a software application; and process the graphics calls to generate the plurality of graphics commands and inserting the graphics commands into the push buffer following the at least one additional command.

16. The computing device of claim 15, wherein the sets of commands to configure each of the two or more processing units to render and display a different portion of the graphics image comprise a plurality of commands that configure one of the two or more processing units to execute at least one command defining one of the different partitions of the mosaic display surface.

17. The computing device of claim 16, wherein the plurality of commands that configure one of the two or more processing units to execute the at least one command defining one of the different partitions of the mosaic display surface comprise a set device mask command and a processing unit identifier command that configure the processing units such that only the processing unit associated with the processing unit identifier command executes the at least one command defining one of the different partitions of the mosaic display surface.

18. The computing device of claim 15, wherein the at least one additional command to configure all of the two or more processing units to execute all subsequent commands in the push buffer comprise a set device mask command and an everyone command.

19. The computing device of claim 15, wherein:

the software driver is a graphics driver; and the software application perceives only a single high-resolution virtual display.

20. The computing device of claim 15, wherein the different portions of the graphics image rendered by each of the two or more processing units overlap.

* * * * *